April 28, 1959     Z. R. MOCARSKI     2,884,131
LIQUID LEVEL SIGNALING MEANS
Filed July 5, 1957     2 Sheets-Sheet 1
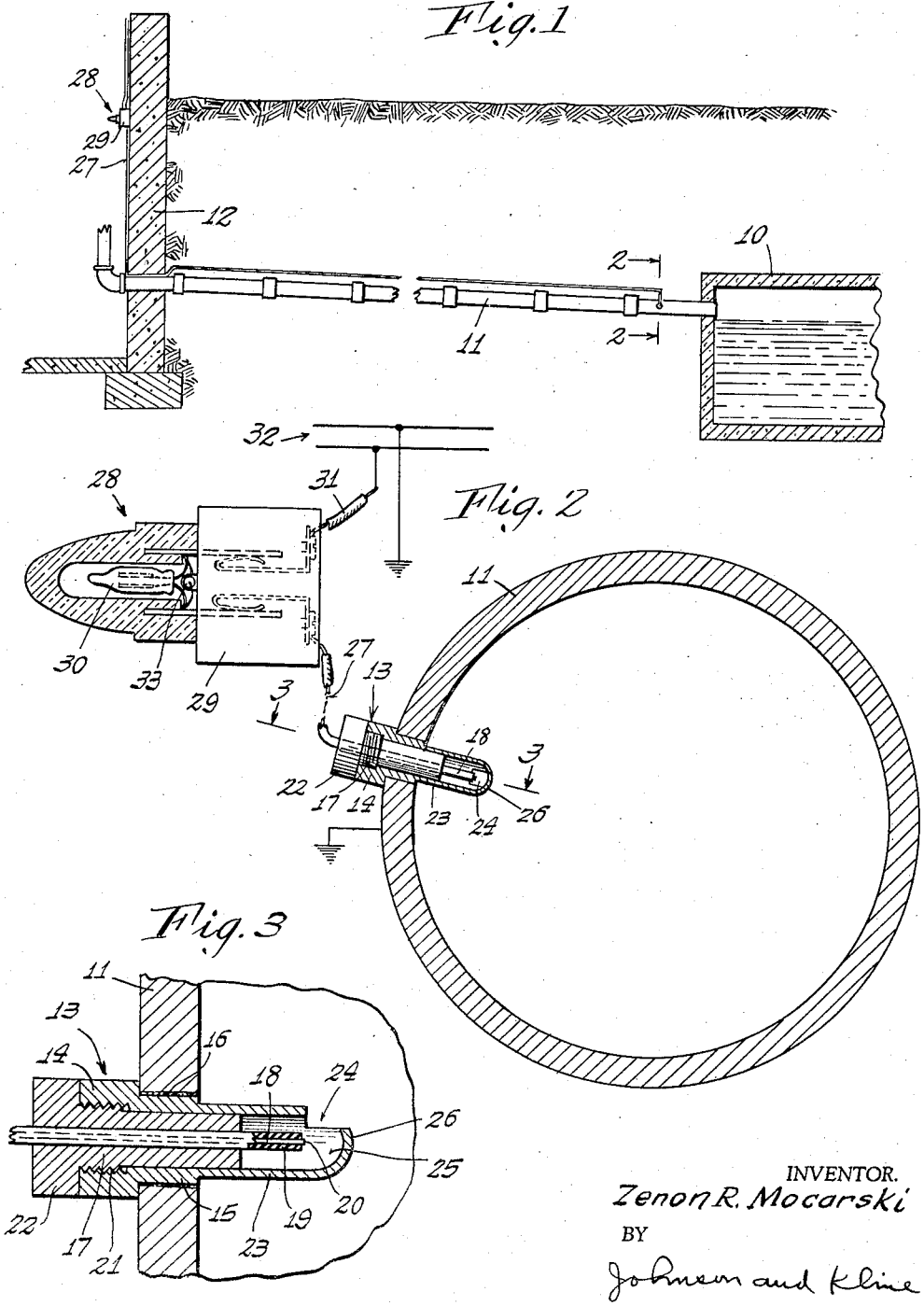
INVENTOR.
Zenon R. Mocarski
BY
Johnson and Kline
ATTORNEYS INVENTOR.
Zenon R. Mocarski

United States Patent Office 2,884,131
Patented Apr. 28, 1959

2,884,131
LIQUID LEVEL SIGNALING MEANS
Zenon R. Mocarski, Bridgeport, Conn.
Application July 5, 1957, Serial No. 670,036
1 Claim. (Cl. 210—93)

This invention relates to signaling means, and more particularly to improved means for indicating when the level of liquid in a tank or other receiver reaches a predetermined point.

Heretofore it has been proposed to indicate the level of liquid in a tank by providing a float-operated switch but such devices have moving parts which are liable to get out of order and fail in their intended functions.

It is an object of this invention to provide a level indicating device which has no moving parts but merely depends on contacting the liquid involved to close the circuit to a warning device such as a visible or audible signal.

More specifically, the present invention is concerned with giving a warning signal when the liquid in collector tanks, such as septic tanks, reaches a level beyond which there would be danger of overflowing or backing up in the feed pipes.

In the case of collector tanks such as septic tanks, great inconvenience can be experienced and substantial damage done should the tank become filled and the waste and water back-up in the soil pipes and overflow at their inlets. This problem is further aggravated by the fact that these conditions usually occur without previous warning and there is no way to anticipate their occurrence.

It has been proposed heretofore to use in the tank of a septic tank system a float-operated switch, but it has been found that waste material, including solid and semi-solid material, would soon interfere with the action of the float and other moving parts and render their operation uncertain at the critical time.

Such arrangements and their difficulties have been obviated by the present invention in which there are no moving parts to be engaged by the liquid whose level is to be sensed.

To this end, the present invention provides a simple sensing device consisting, in its preferred form, of a plug-like body to be inserted in and secured to a liquid carrier and having within it electric current-conducting means connectable to a source of current and a signal producing device, said conducting means causing the circuit to the signal device to be closed when contacted by liquid in the carrier.

Such a sensing means may be placed in the wall of a septic or other tank to cause a signal to be given when the liquid reaches a predetermined level, but when the sensing device is placed in the septic tank there is the danger of the current-conducting means being fouled or coated by greasy substances in, or sludge formed on the surface of, the liquid in the tank before the liquid reaches a dangerous level and thus be rendered inoperative.

I have discovered that in a septic tank system a properly constructed sensing device may advantageously be placed in the wall of the soil pipe leading to the septic tank rather than in the wall of the septic tank itself, and when so placed operates reliably and is not fouled by the contents of the liquid in the tank.

According to the present invention, the sensing device is so constructed and so positioned in the soil pipe with reference to the level in the septic tank, at which the flow of liquid into the septic tank is retarded or stopped and will back-up into the soil pipe, that the liquid, the flow of which is retarded or stopped, will close the signal circuit and yet the liquid which freely flows through the soil pipe into the septic tank will not cause the signal circuit to be closed.

For this purpose, the sensing device is provided with a shield (preferably though not necessarily integral with the mounting plug) which partially encircles the current-conducting means and prevents the free-flowing liquid from engaging the conducting means in such a way as to close the circuit. The shield has an opening on the side toward the septic tank, i.e., the downstream side, to permit the slowed-down or backing-up fluid to enter the shield and cause the signal circuit to be closed.

The liquid flowing through the soil pipe normally has considerable velocity and as it passes over the shield creates a cavity at the downstream side of the shield which tends to prevent the liquid from entering the shield and causes any liquid which might happen to enter the shield to be sucked out before it can close the signal circuit.

The flow of liquid through the soil pipe is normally intermittent and should the volume of flow be abnormal so that the signal circuit is closed, it will only be closed momentarily unless the tank is dangerously full, for as soon as the flow ceases and the soil pipe clears the liquid will drain from the shield and the circuit will again open and the signal will no longer be given. This condition which will occur very seldom will not be misleading because it will be understood that it is only when the signal continues to be given that it indicates that the tank is dangerously full.

It will be understood, of course, that the signal device will be placed in the soil pipe at an elevation at which the current-conducting means will be engaged by the liquid when the septic tank is about full.

In one form of the invention, the current-conducting means includes a single contact connected to the live side of a current-supply circuit, the circuit being closed through the liquid to the ground and hence to the grounded side of the circuit.

In another form of the invention, the current-conducting means includes two juxtaposed contacts in which case the ground is not depended upon but instead two wires are run from the sensing device to the current source and signal means.

Other features and advantages will hereinafter appear.
In the accompanying drawings:

Figure 1 is a schematic view showing a septic tank buried in the ground with the sensing device in the soil pipe which leads from the facilities in the building to the septic tank.

Figure 2 shows the soil pipe in cross section with the sensing device of the present invention mounted in and projecting into the soil pipe and one form of signal device connected in circuit with the sensing device.

Figure 3 is a fragmentary vertical section taken on the line 3—3 of Figure 2, and further illustrating the construction and arrangement of the sensing means.

Figure 4:
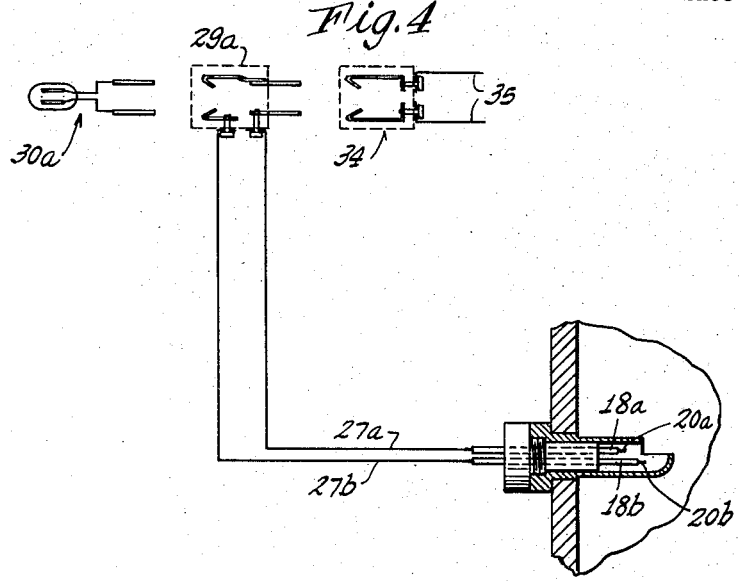
Figure 4 is a view similar to Figure 3, showing the form of sensing device having two electrodes, and also showing the manner in which the sensing device may be connected to a current source and to a signal lamp.

As shown in the accompanying drawings, the septic tank 10 is buried in the ground as usual and is connected to a soil pipe 11 extending from the building generally indicated at 12. As usual, the soil pipe pitches downwardly from the building 12 to the septic tank and enters the septic tank near the top thereof so that liquids which may include water and solid and semi-solid material will flow from the building into the septic tank. After the septic tank has been used for a period of time, it can occur that the liquid and other matter in the septic tank is not disposed of as intended and accumulates to a point where the tank becomes filled and the liquid backs up into the soil pipe with the result that the plumbing connected to the soil pipe overflows. As indicated above, it is an object of this invention to give a timely warning that this condition prevails.

Accordingly, the present invention provides in the septic tank system a sensing device 13 which, in the preferred form of this invention, extends into the soil pipe 11 and is in position to close a signal circuit when the level of the liquid in the tank gets too high.

As shown in Figures 2 and 3, the level sensing device comprises a plug-like body 14 which has a reduced portion 15 fitting into a hole provided in a section of the soil pipe 11 and preferably secured in position by cement or other sealing material 16. Within the body 14 there is a sleeve 17 having a longitudinal aperture through which extends a rod or wire 18 preferably of non-corroding metal such as stainless steel and which is encased in insulating material 19 except for its end which has a tip 20 which extends beyond the insulation. The sleeve 17 may have any suitable connection with the body 14— for instance, a screw thread connection 21. The sleeve may have a head portion 22 by which it may be turned to screw it into the plug body 14.

The sensing device 13 is placed in the soil pipe 11 at a level at which the tip 20 of the conductor 18 will be submerged in the liquid when the liquid is retarded or stopped from flowing through the soil pipe due to the rise of the liquid level in the tank so as to close a circuit to a signaling device when this occurs.

To avoid contact of the tip 20 with the liquid during the normal or free flow of liquid through the soil pipe, the present invention provides a shield 23 around but spaced from the tip 20 of the conductor. The shield has an opening 24 through which the liquid may have access to the conducting tip 20 located in the chamber 25 formed by the shield.

The shield is preferably round in cross section and has a spherical closed end portion 26 and the opening 24 is formed, as it were, by cutting out a segment of the end portion at one side of the shield.

The sensing device 13 is so positioned in the soil pipe that the closed side of the shield is upstream with relation to the direction of flow of liquid through the pipe 11 and the opening 24 is downstream, thus, when liquid flows through the pipe 11, which it usually does at considerable velocity, it is diverted from entering the opening 24, thus preventing the liquid from engaging the contact tip 20 and causing a signal to be given.

Moreover, when the sensing device is so positioned, the chamber 25 will be selfdraining and the suction effect of the water passing over the round shield will suck out any droplets of water which happen to accidentally accumulate in the chamber 25.

However, when the liquid in the tank 10 reaches a dangerous level, the flow of liquid into the tank will be retarded or stopped and when this occurs liquid may enter the chamber 25 and make contact with the tip 20, and if this occurs when the tank is dangerously full the circuit will be maintained closed by the electrical contact between the tip 20 and the liquid.

Should the flow of liquid be temporarily slowed down by an obstruction or excessive flow, when this condition no longer prevails the liquid will flow out from the chamber 25 and the circuit will open. The contact tip is preferably spaced substantially from the plug body 14 and centrally disposed within the chamber 25 so that no droplets will remain both in contact with the tip 20 and the plug body 24 when the liquid is drained through the opening 24. The momentary closing of the circuit under the conditions just above referred to will not give a false signal, since it will be understood that only when the signal is maintained for a prolonged period would it indicate that a dangerous condition existed.

In the form of the invention shown in Figures 2 and 3, the current-conducting means in the sensing device consists of a single conductor 18 and the circuit is closed between the tip 20, the liquid in the pipe 11 and the ground. Hence, there is needed only a single wire 27 leading from the sensing device to the signal means.

As shown in Figure 1, this wire is led into the building and is connected to a visual signal 28. As shown in Figure 2, the wire 27 is connected to a receptacle 29 having a prong carrying neon bulb 30, the wire 27 being thereby connected to one side of the neon bulb. The other side of the neon bulb is connected through the receptacle by a wire 31 to one side of the source of current 32, the other side of which is connected to ground.

If desired, a suitable shunting resistance 33 may be connected across the terminals of the neon tube to reduce the voltage in the system.

The sensing device may have two current-conducting members such as shown in Figure 4, in which there are two parallel conductors 18a and 18b extending through the sleeve 17. When as shown two conductors are used, it is preferable that the tips 20a and 20b thereof be staggered slightly so as to avoid a drop of liquid clinging simultaneously to both and thus closing the circuit unintentionally. The two conductors 18a and 18b are connected by wires 27a and 27b leading to a combined plug and receptacle 29a which may be plugged into a wall receptacle 34 connected to house current 35. The plug receptacle 29a receives the prongs of the neon bulb device 30a. This being a closed circuit not depending on ground transmission, the shunting resistance may be omitted from the neon tube device 30a.

Figure 5:
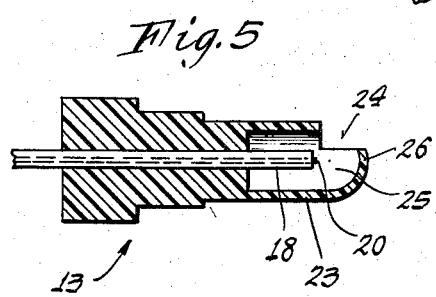
Figure 5 is a view like Figure 3, but showing the body of the sensing device being made of one piece of molded material.

In describing the sensing device shown in Figure 3, it was stated that the plug body 14 and the sleeve 17 are two pieces united by screw threads 21, but if the plug is made of moldable material such as Bakelite, porcelain or other similar materials so that the chamber 25 can be formed in the molding operation, the body may be formed of one piece as shown in Figure 5.

When, as shown in Figure 3, the plug body is made of metal, it is preferable that it be made of non-corroding metal such as stainless steel, and it is also preferable that it be provided with an oxide coating to insulate it from the liquid and thus further reduce the chance of unintentionally closing the circuit between the wall of the chamber 25 and the contact tip 20.

Variations and modifications may be made within the scope of the claim and portions of the improvements may be used without others. One such variation would be to make the plug 14 and the sleeve 15 of insulating material.

I claim:

In a septic tank system, a septic tank, a soil pipe leading to the septic tank, and signal means including an electric signal remote from the tank, a circuit including said signal, a source of current, and a liquid level sensing device mounted on and projecting into the soil pipe to give a warning signal when the liquid in the septic tank reaches a predetermined level, in which the sensing device includes electric contact means positioned in the soil pipe to be contacted by liquid accumulating in said soil pipe to a determinate level therein, and in which the sensing device includes a shield around the contact means in spaced relation thereto and enclosing the latter except for an opening on its downstream side through which liquid remaining in the soil pipe may engage said contact means.

References Cited in the file of this patent

UNITED STATES PATENTS

| | | |
|---|---|---|
| 1,164,882 | Sommer | Dec. 21, 1915 |
| 1,524,937 | Keeler | Feb. 3, 1925 |
| 2,769,140 | Obenshain | Oct. 30, 1956 |
| 2,792,566 | Shanhouse et al. | May 14, 1957 |
| 2,810,879 | Cade et al. | Oct. 22, 1957 |